United States Patent
Murali et al.

(10) Patent No.: US 8,042,087 B2
(45) Date of Patent: Oct. 18, 2011

(54) METHOD TO DESIGN NETWORK-ON-CHIP (NOC)-BASED COMMUNICATION SYSTEMS

(75) Inventors: Srinivasan Murali, Lausanne (CH); Luca Benini, Ferrara (IT); Giovanni De Micheli, Lausanne (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 344 days.

(21) Appl. No.: 12/375,525

(22) PCT Filed: Oct. 10, 2007

(86) PCT No.: PCT/IB2007/054122
§ 371 (c)(1),
(2), (4) Date: Jan. 28, 2009

(87) PCT Pub. No.: WO2008/044211
PCT Pub. Date: Apr. 17, 2008

(65) Prior Publication Data
US 2009/0313592 A1 Dec. 17, 2009

Related U.S. Application Data

(60) Provisional application No. 60/850,275, filed on Oct. 10, 2006.

(51) Int. Cl.
G06F 17/50 (2006.01)
G06F 11/00 (2006.01)
H04B 3/36 (2006.01)

(52) U.S. Cl. ........ 716/138; 716/111; 716/112; 716/113; 716/126; 370/235; 370/293

(58) Field of Classification Search .................. 716/111, 716/112, 113, 126, 138; 370/235, 293
See application file for complete search history.

(56) References Cited

U.S. PATENT DOCUMENTS

| | | | | |
|---|---|---|---|---|
| 6,968,514 | B2* | 11/2005 | Cooke et al. | 716/102 |
| 2006/0077914 | A1* | 4/2006 | Rhee | 370/293 |
| 2006/0161875 | A1* | 7/2006 | Rhee | 716/14 |
| 2009/0004981 | A1* | 1/2009 | Eliezer et al. | 455/127.1 |
| 2009/0070549 | A1* | 3/2009 | Solomon | 712/10 |

(Continued)

OTHER PUBLICATIONS

Meloni et al.; "Routing Aware Switch Hardware Customization for Networks on Chips"; Publication Year: 2006; Nano-Networks and Workshops, 2006. NanoNet '06. 1st International Conference on; pp. 1-5.*

(Continued)

Primary Examiner — Helen Rossoshek
(74) Attorney, Agent, or Firm — DLA Piper LLP US

(57) ABSTRACT

A method to design a Networks on Chips (NoCs)-based communication system for connecting on-chip components in a multicore system, said system comprising several elements communicating through the communication system, said communication system comprising at least switches, said method comprising the steps of modelling the applications running on the multicore system, establishing the number and configuration of switches to connect the elements, establishing physical connectivity between the elements and the switches, for each two pairs of communicating elements: (a) a defining a communication path, (b) calculating metrics as affected by the need to render said path into physical connectivity, taking into account any previously defined physical connectivity, (c) iterating the steps a and b for a plurality of possible paths, (d) choosing the path having the optimal metrics, and (e) establishing any missing physical connectivity between the switches so that the selected optimal path occurs across physically connected switches.

21 Claims, 4 Drawing Sheets

U.S. PATENT DOCUMENTS

Figure 1:
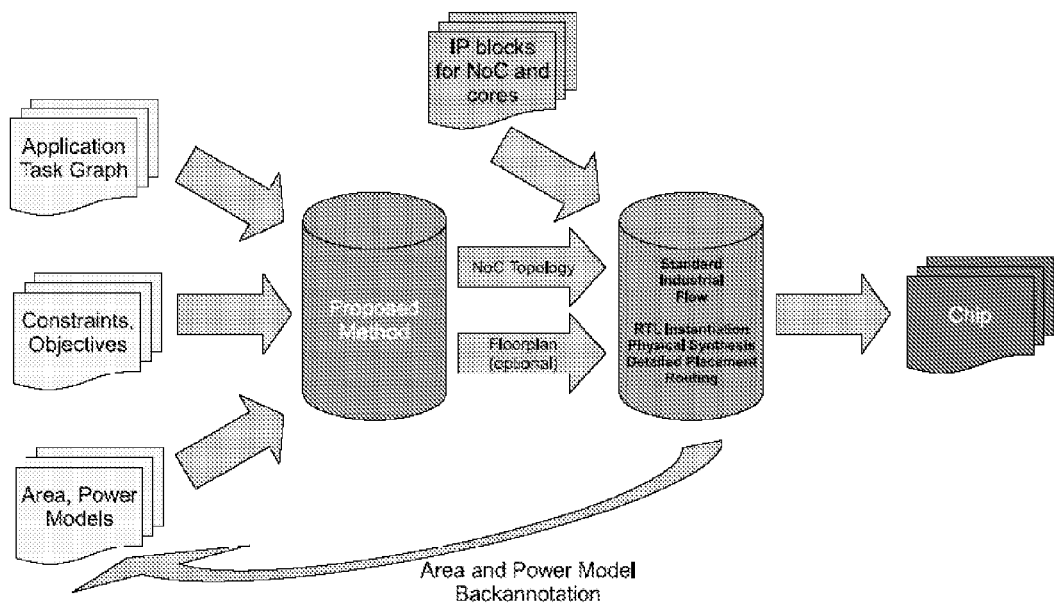

2010/0080124 A1* 4/2010 Angiolini et al. .............. 370/235

OTHER PUBLICATIONS

Chi-Ying et al.; "VLSI implementation of a switch fabric for mixed ATM and IP traffic"; Publication Year: 2000; Design Automation Conference, 2000. Proceedings of the ASP-DAC 2000. Asia and South Pacific; pp. 5-6.*

Kim et al.; A low latency router supporting adaptivity for on-chip interconnects; Publication Year: 2005; Design Automation Conference, 2005. Proceedings. 42nd; pp. 559-564.*

Benini, L., "Application Specific NoC Design", IEEE, pp. 1-5 (2006).

Sethuraman, B., et al., OptiMap: A Tool for Automated Generation of NoC Architectures Using Multi-Port Routers for FPGAs, IEEE, pp. 1-6 (2006).

Benini, L., et al., Networks on Chips: A New SoC Paradigm, IEEE Computers, pp. 70-78 (2002).

Bertozzi, D., et al., NoC Synthesis Flow for Customized Domain Specific Multiprocessor Systems-on-Chip, IEEE Transactions on Parallel and Distributed Systems, vol. 16, No. 2, pp. 113-129 (2005).

Srinivasan, K., et al., ISIS: A Genetic Algorithm Based Technique for Custom On-Chip Interconnection Network Synthesis, IEEE, pp. 623-628 (2005).

Srinivasan, K., et al., A Low Complexity Heuristic for Design of Custom Network-on-Chip Architectures, IEEE, pp. 1-6 (2006).

Pasricha, S., et al., Constraint-Driven Bus Matrix Synthesis for MPSoC, IEEE, pp. 30-35 (2006).

International Search Report issued in PCT/IB2007/054122 dated Mar. 4, 2008.

* cited by examiner sustained traffic rates (b) SCG graph (c) Path selection    Fig. 6c

METHOD TO DESIGN NETWORK-ON-CHIP (NOC)-BASED COMMUNICATION SYSTEMS

1 INTRODUCTION

Today's multicore systems (MCSs) integrate several processor cores, hardware blocks, co-processors, memories, Digital Signal Processors (DSPs) and I/O blocks on the same chip. MCSs have high design complexity and are widely used in several application domains such as wireless platforms, multi-media devices and telecommunication platforms, to name a few.

Due to technology scaling, the number of processor, memory and hardware cores integrated on an MCS are increasing. This results in increased computation and communication complexity of the design, and scalable approaches are needed to design the system. As wire scaling is not on-par with transistor scaling, the interconnect architecture is becoming a bottleneck for the entire system performance and efficient ways to tackle the communication architecture complexity is needed.

Traditionally, bus-based architectures have been used to interconnect the various cores of the MCSs. To meet the increasing communication demands, the bus-based architectures have evolved over time from a single shared bus to multiple bridged buses and to crossbar-based designs.

To effectively tackle the interconnect complexity of current and future MCSs, a micro-network based interconnect architecture is needed to connect the cores. A communication-centric design approach, Networks on Chips (NoCs), has recently emerged as the design paradigm for designing such scalable micro-networks for MCSs [1]. NoCs have better modularity and design predictability when compared to bus-based systems.

Designing an efficient NoC architecture while satisfying the application performance constraints is a complex process. The design issues span several abstraction levels, ranging from high-level application modeling to physical layout level implementation. Some of the most important phases in designing the NoC include modeling the application traffic characteristics, synthesizing the topology or structure of the network, setting various design parameters (such as frequency of operation or link width), generating the RTL code for the network components and generating the physical design (such as synthesis and layout) models. In order to handle the design complexity and meet the tight time-to-market constraints, it is important to automate most of these NoC design phases. To achieve design closure, the different phases should also be integrated in a seamless manner.

1.1 BRIEF DESCRIPTION OF THE INVENTION

For the use of NoCs to be feasible in today's industrial designs, a custom-tailored, application-specific architecture that satisfies the objectives and constraints of the targeted application domain is required. In this work we present a method for synthesizing such application-specific NoC architectures.

In the present specification, we present a method for synthesizing the best topology that is tailor-made for a specific application and satisfies the communication constraints of the design.

This best topology is achieved by a method to design Networks on Chips (NoCs)-based communication system for connecting on-chip components in a multicore system, said system comprising several elements such as processors, hardware blocks, memories, communicating through the communication system, said communication system comprising at least switches, said method comprising the steps of:
  obtaining predefined communication characteristics modelling the applications running on the multicore system,
  establishing the number and configuration (as in input/output size, buffers) of switches to connect the elements,
  establishing physical connectivity between the elements and the switches,
  for each of at least two pairs of communicating elements:
    a defining a communication path, that is, a sequence of switches to be traversed to connect the aforementioned pair of communicating elements,
    b calculating metrics as affected by the need to render said path into physical connectivity, said metrics being selected among one or a combination of power consumption of the involved switches, area of the involved switches, number of inputs and outputs of the involved switches, total length of wires used, maximum possible speed of operation of the system and number of switches to be traversed, taking into account any previously defined physical connectivity,
    c iterating the steps a and b for a plurality of possible paths,
    d choosing the path having the optimal metrics,
    e establishing any missing physical connectivity between the switches so that the selected optimal path occurs across physically connected switches.

1.2 BRIEF DESCRIPTION OF THE FIGURES

Figure 2:
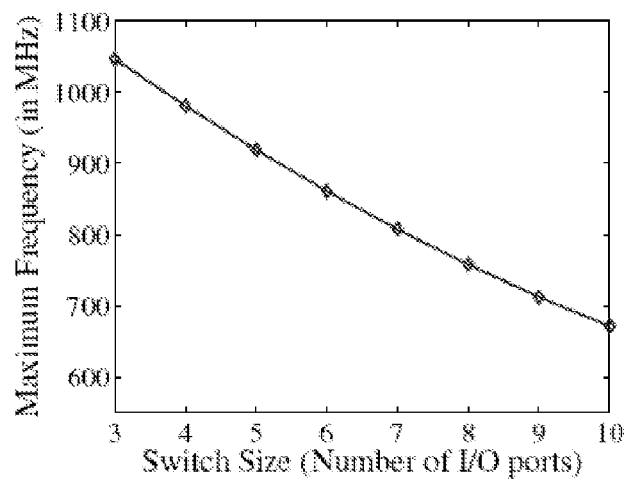
Figure 3A:
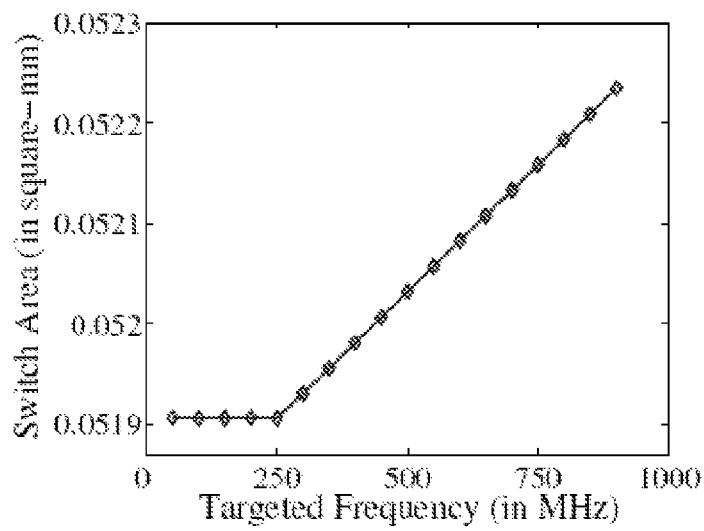
Figure 3B:
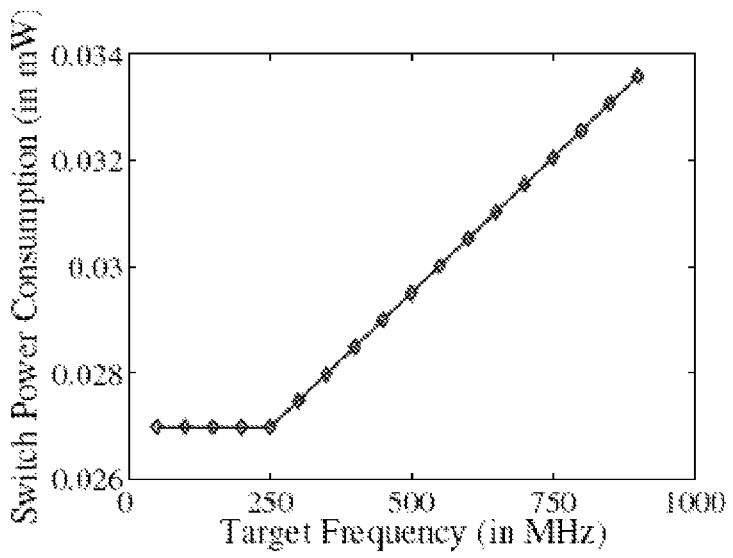
Figure 4:
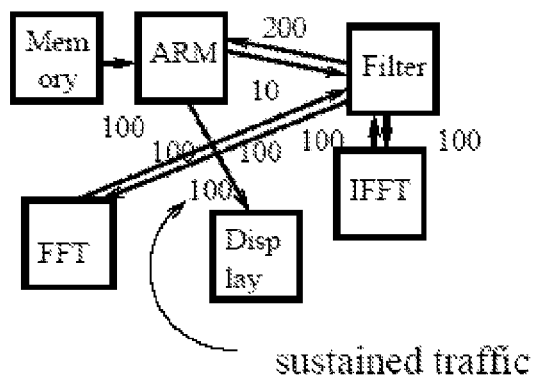
Figure 5:
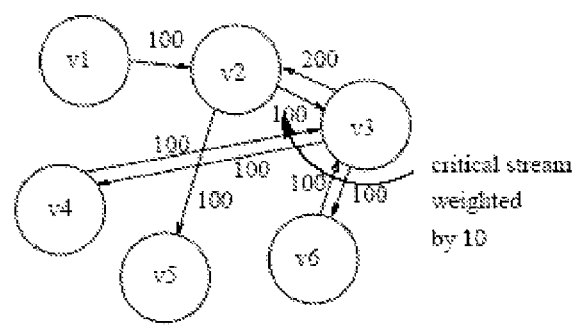
Figure 6A:
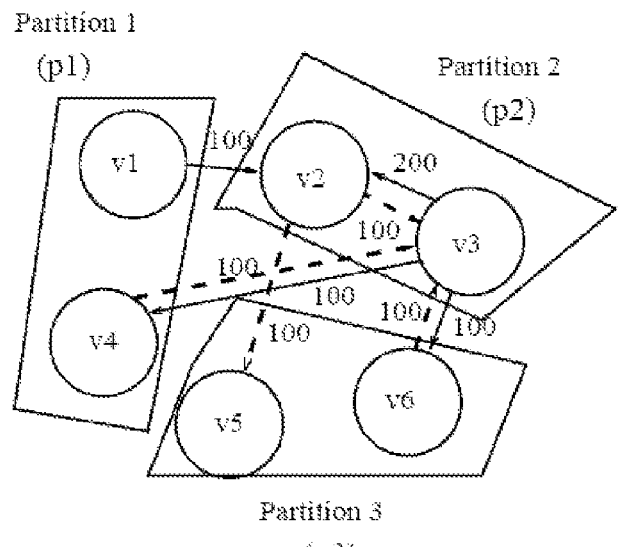
Figure 6B:
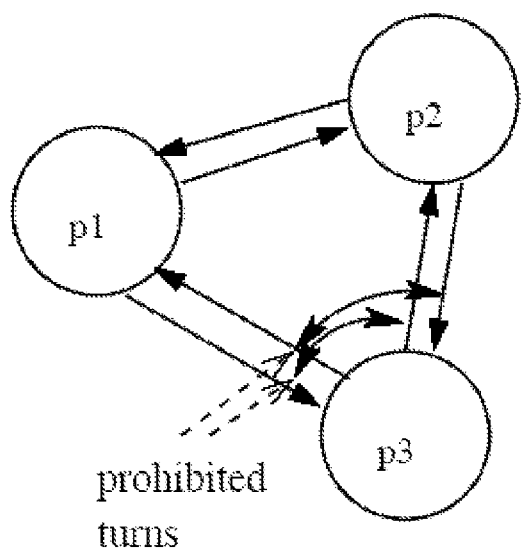
Figure 7:
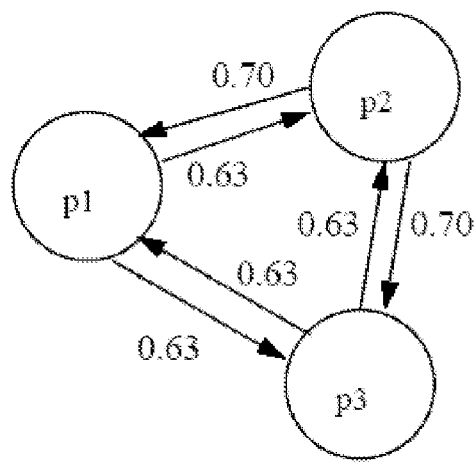
Figure 7:
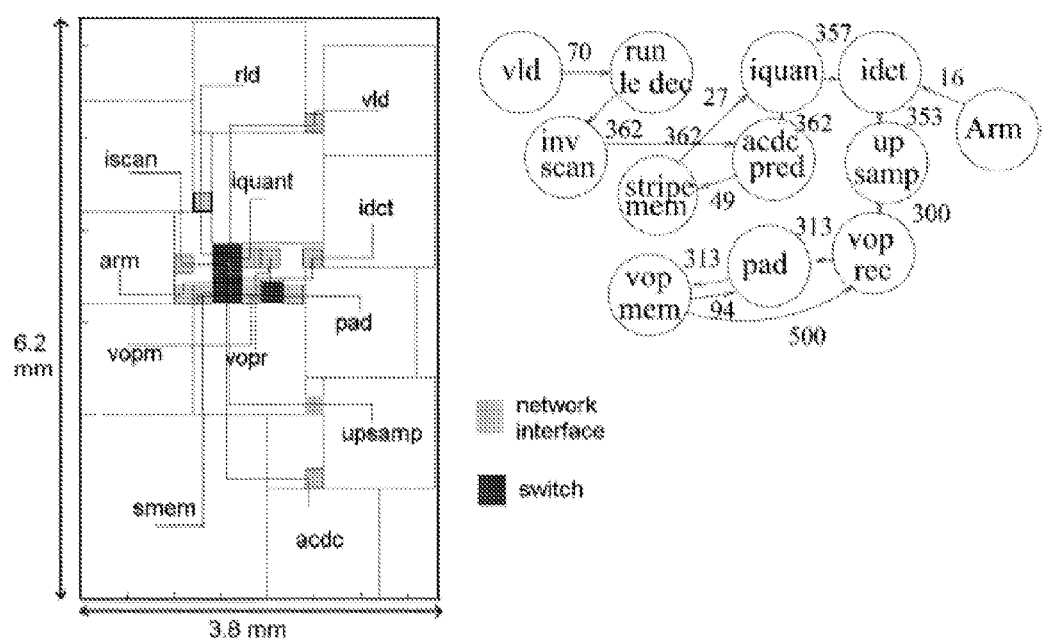

The invention will be better understood thanks to the attached figures in which:
  FIG. 1 illustrates the complete design flow of a Network-on-Chip based MCS,
  FIG. 2 illustrates the maximum switch frequency as a function of switch size,
  FIGS. 3a and 3b illustrate an example of the impact of frequency on the area and energy of a 5 input, 5 output switch,
  FIG. 4 illustrates an example of a filter application,
  FIG. 5 illustrates an example of core graph with sustained rates and critical streams,
  FIGS. 6a to 6c illustrate various examples of the process, 6a for the min-cut partitions, 6b for the Switch Cost Graph (SCG) and 6c for the path selection,
  FIG. 7 illustrates a custom topology floorplan and core graph.

1.3 DETAILED DESCRIPTION

Our proposed design flow has several salient features:
1. The synthesis method supports different metrics, such as NoC power consumption, area, wire length, size (number of inputs, outputs) of the switches, delay, and maximum possible speed of operation. Some of these metrics can be used as objectives to be optimized by the method, while some can be used as constraints that need to be met. As an example, the designer can use the method to minimize the NoC power consumption or area or a linear combination of both. The method can support constraints on several of these parameters.
2. The topology method incorporates mechanisms to guarantee the generation of networks that are free from deadlocks, which is critical for the deployment of custom NoC topologies in real designs. The deadlock freedom is achieved without the use of special hardware mechanisms.

3. The method uses a floorplan-aware topology design process. It considers the wiring complexity of the design for accurate timing and power consumption estimation.
4. The method leverages models for the area, power and timing of the network components (switches and links), which are utilized during the topology synthesis process. For maximum effectiveness, the values can be obtained from layouts of the network components with back-annotated resistance and capacitance information, based on the switching activity of the components.
5. To achieve design closure and fast time-to-market, the actual physical layer metrics are considered during the high-level topology synthesis phase itself. The timing information of switches and links can be accurately characterized from layouts. We model the maximum frequency that can be supported by a switch as a function of the switch size. During the synthesis process, we steer the algorithms to only synthesize those switches that would support the desired NoC frequency. From the floorplan of the NoC design, estimates of the length of the NoC wires are obtained, and are then used to detect timing violations on the interconnects early in the design cycle.
6. The method automatically tunes several important NoC architectural parameters (such as the frequency of operation, data width of the links). The number of data lines (i.e. the data width) between two switches is varied by the method iteratively. As an example, if 32-bit lines are used for connecting two switches, the data is segmented into 32-bit chunks and transmitted over the link between the switches. When the bit lines are fewer, the data needs to be segmented to a finer granularity and the delay is higher. On the other hand, the area and number of wires required is lower. The method explores such design trade-offs between area, power, performance, wiring, etc.
7. The method can establish more than one physical link between adjacent switches, if required.

1.4 Background on NoC Topology Synthesis

The standard topologies (mesh, torus, etc.) that have been used in macro-networks result in poor performance and have large power and area overhead when used for MCSs. An application-specific NoC with structured wiring, which satisfies the design objectives and constraints, is useful to have feasible NoC designs.

The deadlocks that can occur in NoCs can be broadly categorized into two classes: routing-dependent deadlocks and message-dependent deadlocks. Routing-dependent deadlocks occur when there is a cyclic dependency of resources created by the packets on the various paths in the network.

Message-dependent deadlocks occur when interactions and dependencies are created between different message types at network endpoints, when they share resources in the network. Even when the underlying network is designed to be free from routing-dependent deadlocks, the message-level deadlocks can block the network indefinitely, thereby affecting the proper system operation.

For proper system operation, it is critical to remove both routing and message-dependent deadlocks in the network. It is also important to achieve deadlock freedom with minimum NoC area and power overhead. In our topology synthesis process, we integrate methods to find paths that are free from both routing and message-dependent deadlocks.

2 Design Flow

A possible way to build a complete design flow based on the invention is presented in FIG. 1. In the first phase of the flow, the user specifies the objectives and constraints that should be satisfied by the NoC. The application traffic characteristics and the area and power models for the NoC components are also taken as inputs. The method automatically derives the NoC architecture that optimizes the user objectives while satisfying the design constraints. The different steps in this phase are presented in detail in Algorithm 1 and in Section 4. In the outer iterations of Algorithm 1, the key NoC architectural parameters (frequency of operation and link width) are varied within a set of suitable values. The bandwidth available on each NoC link is the product of the NoC frequency and the link width. During the topology generation step, the algorithm ensures that the traffic on each link is less than or equal to its available bandwidth. The topology generation step is performed once for each set of architectural parameters of the target design space. Several topologies with different numbers of switches are explored, starting from a topology where all the cores are connected to one switch, to a design point where maximum number (defined by the user) of switches is used. The analysis of each topology includes finding the size of the switches (the number of input/output ports), establishing the connectivity between the switches and connectivity with the cores, and finding deadlock-free routes for the different traffic flows. Subsequently, to have an accurate estimate of the design area and wire lengths, the floorplanning of each candidate topology is automatically performed, based on the NoC area models and user-specified values for the area demands of the other IP cores in the design. The floorplanning process thus determines the 2D position of the cores and network components. Based on the frequency point and the obtained wire lengths, any timing violations on the wires are detected and the power consumption on the links is obtained. Eventually, from the set of all synthesized topologies and architectural parameter design points, the topology and the architectural configuration that optimize the user's objectives, while satisfying all the design constraints, are chosen.

The next step of the flow is based on existing back-end tools for hardware instantiation (such as RTL instantiation, placement and routing), after which the chip of the design can be fabricated.

---

Algorithm 1 NoC architecture synthesis (phase 2 of design flow)

1:  for NoC frequency varied in a user-defined range do
2:      for Link data width varied in a user-defined range do
3:          for The number of switches varied from 1 to maximum user-defined number do
4:              Synthesize the best topology with the particular frequency, link width and switch count
5:              Perform floorplan of the synthesized topology, get link power consumption, detect timing delays
6:          end for
7:      end for
8:  end for
9:  Choose topology that best optimizes user objectives satisfying all design constraints The flow outlined above is composed of several steps. Therefore, quickly achieving the design closure is not trivial. We tackle the problem in several ways. First, we try to make sure as early as possible, i.e. during the topology generation phase itself, that the timing constraints after the place&route phase will not be violated. The use of accurate area, power and timing models for the NoC components further bridges the gap between the topology design phase and the back-end physical-design phase.

To bridge the gap between the initial traffic models and the actual observed traffic after simulating the designed NoC, we use a mismatch parameter. If the performance constraints are not met during simulation, the input traffic models are scaled using this parameter and the design process is repeated.

3 Input Models 3.1 Area, Power Models

Accurate analytical models can be used for calculating the power consumption, area and delay of the network components. To get an accurate estimate of these parameters, the place&route of the components can be performed and accurate wire capacitances and resistances can be obtained, as back-annotated information from the layout.

A large number of implementation runs should then be performed, varying several parameters of the NoC switches, such as the number of input, output ports, the link width and the amount of switching activity. When the size of a NoC switch increases, the size of the arbiter and the crossbar matrix inside the switch also increases, thereby increasing the critical path of the switch. As an example of an accurate delay estimation of the switches, the maximum frequency that can be supported by the switches, as a function of the switch size, is presented in FIG. 3($b$).

Linear or non-linear regression can be used to build analytical models for the area and power consumption of the components as a function of these parameters. Power consumption on the wires can also be obtained at the layout level.

The impact of the targeted frequency of operation on the area and energy consumption of an example 5 input, 5 output switch, obtained from layout-level estimates, is presented in FIG. 3. Note that we plot the energy values (in mW/MHz) instead of the total power, so that the inherent increase in power consumption due to increase in frequency is not observed in the plot. When the targeted frequency of operation is below a certain frequency, referred to as the nominal operating frequency (around 250 MHz in the plots), the area and energy values for the switch remain the same. However, as the targeted frequency increases beyond the nominal frequency, the area and energy values start increasing linearly with the frequency. This is because the synthesis tool tries to match the desired high operating frequency by utilizing faster components that have large area and energy overhead. When performing the area, power estimates, we also model this impact of desired operating frequency on the switch area, power consumption.

3.2 Traffic Models

The traffic characteristics of the application are represented by a graph, defined as follows:

Definition 1 The core graph is a directed graph, G(V, E) with each vertex $v_i \in V$ representing a core and the directed edge ($v_i$, $v_j$), denoted as $e_{i,j} \in E$, representing the communication between the cores $v_i$ and $v_j$. The weight of the edge $e_{i,j}$, denoted by $comm_{i,j}$ represents the sustained rate of traffic flow from $v_i$ to $v_j$ weighted by the criticality of the communication. The set F represents the set of all traffic flows, with value of each flow, $f_k$, $\forall k \in 1 \ldots |F|$, representing the sustained rate of flow between the source ($s_k$) and destination ($d_k$) vertices of the flow.

The core graph for a small filter example (FIG. 4) is shown in FIG. 5. The edges of the core graph are annotated with the sustained rate of traffic flow, multiplied by the criticality level of the flow.

Definition 2 The message type for each flow $f_k$, $\forall k \in 1 \ldots |F|$, is represented by $mtype_k$.

As an example, when a system has request and response message types, the $mtype_k$ value can be set to 0 for request messages and 1 for response messages.

4 Design Process

The steps of the topology design process are explained in this section. In the first step of Algorithm 2, a design point θ is chosen from the set of available or interesting design points φ for the NoC architectural parameters. The topology synthesis method automatically applies parameters such as operating frequency ($freq_\theta$) and link width ($lw_\theta$) to the NoC. As both the frequency and the link width parameters can take a large set of values, considering all possible combinations of values would be inconvenient to explore. The system designer can trim down the exploration space and give the interesting design points for the parameters. The designer usually has knowledge of the range of these parameters. As an example, the designer can choose the set of possible frequencies from minimum to a maximum value, with allowed frequency step sizes. Similarly, the link data widths can be set to multiples of 2, within a range (say from 16 bits to 128 bits). Thus, we get a discrete set of design points for φ. The rest of the topology design process (steps 3-15 in Algorithm 2) is repeated for each design point in φ.

As the topology synthesis and mapping problem is NP-hard, we present efficient heuristics to synthesize the best topology for the design. For each design point φ, the algorithm synthesizes topologies with different numbers of switches, starting from a design where all the cores are connected through one big switch until the design point where user defined maximum number of switches is used. The reason for synthesizing these many topologies is that it cannot be predicted beforehand whether a design with few bigger switches would be more power efficient than a design with more smaller switches. A larger switch has more power consumption than a smaller switch to support the same traffic, due to its bigger crossbar and arbiter. On the other hand, in a design with many smaller switches, the packets may need to travel more hops to reach the destination. Thus, the total switching activity would be higher than a design with fewer hops, which can lead to higher power consumption.

For the chosen switch count i, the input core graph is partitioned into i min-cut partitions (step 3). The partitioning is done in such a way that the edges of the graph that are cut between the partitions have lower weights than the edges that are within a partition (refer to FIG. 6($a$)) and the number of vertices assigned to each partition is almost the same. Thus, those traffic flows with large bandwidth requirements or higher criticality level are assigned to the same partition and hence use the same switch for communication. Hence, the power consumption and the hop count for such flows will be smaller than for the other flows that cross the partitions.

At this point, the communication traffic flows within a partition have been resolved. In steps 5-9, the connections between the switches are established to support the traffic flows across the partitions. In step 5, the Switch Cost Graph (SCG) is generated.

Definition 3 The SCG is a fully connected graph with i vertices, where i is the number of partitions (or switches) in the current topology.

Please note that the SCG does not imply the actual physical connectivity between the different switches. The actual physical connectivity between the switches is established using the SCG in the PATH_COMPUTE procedure, which is explained in the following paragraphs.

In NoCs, wormhole flow control is usually employed to reduce switch buffering requirements and to provide low-latency communication. With wormhole flow control, deadlocks can happen during routing of packets due to cyclic dependencies of resources (such as buffers). We pre-process the SCG and prohibit certain turns to break such cyclic dependencies. This guarantees that deadlocks will not occur when routing packets. We build the Prohibited Turn Set (PTS) for the SCG, which represents the set of turns that are prohibited in the graph. To provide guaranteed deadlock freedom, any path for routing packets should not take these prohibited turns. These concepts are illustrated in the following example:

EXAMPLE 1

The min-cut partitions of the core graph of the filter example (from FIG. 4) for 3 partitions is shown in FIG. 6(a). The SCG for the 3 partitions is shown in FIG. 6(b). After applying the turn prohibition algorithm, the set of prohibited turns is identified. In FIG. 6(b), the prohibited turns are indicated by circular arcs in the SCG. For this example, both the turns around the vertex P3 are prohibited to break cycles. So no path that uses the switch P3 as an intermediate hop can be used for routing packets.

The actual physical connections between the switches are established in step 8 of Algorithm 2 using the PATH_COMPUTE procedure. The objective of the procedure is to establish physical links between the switches and to find paths for the traffic flows across the switches. Here, we only present the procedure where the user's design objective is to minimize power consumption. The procedures for the other two cases (with hop count as the objective and with linear combination of power and hop count as objective) follow the same algorithm structure, but with different cost metrics.

An example illustrating the working of the PATH_COMPUTE procedure is presented in Example 2. In the procedure, the flows are ordered in decreasing rate requirements, so that bigger flows are assigned first. For each flow in order, we evaluate the amount of power that will be dissipated across each of the switches, if the traffic for the flow used that switch. This power dissipation value on each switch depends on the size of the switch, the amount of traffic already routed on the switch and the architectural parameters used. It also depends on how the switch is reached (from what other switch) and whether an already existing physical channel will be used to reach the switch or a new physical channel will have to be opened. This information is needed, because opening a new physical channel increases the switch size and hence the power consumption of this flow and of the others that are routed through the switch. These marginal power consumption values are assigned as weights on each of the edges reaching the vertex representing that switch in the SCG. This is performed in steps 8 and 11 of the procedure.

---

Algorithm 2 Topology Design Algorithm

1: Choose design point θ from Φ freq$_θ$, lw$_θ$
2:     for i = 1 to maximum number of switches do
3:         Find i min-cut partitions of the core graph
4:         Establish a switch with Nj inputs and outputs for each partition, ∀j ∈ 1•••i. Nj is the number of vertices (cores) in partition i. Check for bandwidth constraint violations
5:         Build Switch Cost Graph (SCG) with edge weights set to 0
6:         Build Prohibited Turn Set (PTS) for SCG to avoid deadlocks
7:         Set β to 0
8:         Find paths for flows across the switches using function PATH_COMPUTE(i, SCG, β PTS, θ)
9:         Evaluate the switch power consumption and average hop count based on the selected paths
10:        Repeat steps 8 and 9 by increasing β in steps, until the hop count constraints are satisfied or until β reaches β$_{thresh}$
11:        If β$_{thresh}$ is reached and hop count is not satisfied, go to step 2
12:        Perform floorplan and obtain area, wire lengths. Check for timing violations and evaluate power consumption on wires
13:        If target frequency matches or exceeds freq$_θ$, and satisfies all constraints, note the design point
14:    end for
15: Repeat steps 2-14 for each design point available in θ

---

Algorithm 3 PATH_COMPUTE(i, SCG, β, PTS, θ)

1:     Initialize the set PHY (i$_1$, j$_1$) to false and Bw_avail(i$_1$, j$_1$) to freq$_θ$ × lw$_θ$, ∀i$_1$, j$_1$ ∈ 1•••i.
2:     Initialize switch size in(j) and switch size out(j) to Nj, ∀j ∈ 1•••i. Find switching_activity(j) for each switch, based on the traffic flow within the partition.
3:     for each flow f$_k$, k ∈ 1 •••|F| in decreasing order of f$_c$ do
4:        for i$_1$ from 1 to i and j$_1$ from 1 to i do
5:            {Find the marginal cost of using link i$_1$, j$_1$}
6:            {If physical link exists, can support the flow and is of the same message type}
7:            if PHY(i$_1$, j$_1$) and Bw_avail(i$_1$, j$_1$) ≥ f$_c$ and (MType(i$_1$, j$_1$) = Mtype$_k$) then
8:                Find cost(i$_1$, j$_1$), the marginal power consumption to re-use the existing link

| | Algorithm 3 PATH_COMPUTE(i, SCG, β, PTS, θ) |
|---|---|
| 9: | else |
| 10: | {We have to open new physical link between $i_1, j_1$} |
| 11: | Find cost($i_1, j_1$), the marginal power consumption for opening and using the link. Evaluate whether switch frequency constraints are satisfied. |
| 12: | end if |
| 13: | end for |
| 14: | Assign cost($i_1, j_1$) to the edge W($i_1, j_1$) in SCG |
| 15: | Find the least cost path between the partitions in which source ($s_k$) and destination ($d_k$) of the flow are present in the SCG. Choose only those paths that have turns not prohibited by PTS |
| 16: | Update PHY, Bw_avail, switch_size_in, switch_size_out, switching_activity, MType for chosen path |
| 17: | end for |
| 18: | Return the chosen paths, switch sizes, connectivity |

When opening a new physical link, we also check whether the switch size is small enough to satisfy the particular frequency of operation. As the switch size increases, the maximum frequency of operation it can support reduces. This information is obtained from the placement&routing of the switches, taken as an input to the algorithms. The message type that is supported by a link between any two switches i and j is represented by MType(i, j). Whenever a path is established for a flow, the links that are newly instantiated in the path are assigned the same message type as the flow. When choosing a path for a flow, we check whether the existing links in the path support the same message type as the flow (step 7 of Algorithm 3). Thus, flows with different message types are mapped onto different physical links in the NoC, thereby removing the chances of a message-level deadlock.

Once the weights are assigned, choosing a path for the traffic flow is equivalent to finding the least cost path in the SCG. This is done by applying Dijkstra's shortest path algorithm in step 15 of the procedure. When choosing the path, only those paths that do not use the turns prohibited by PTS are considered. The size of the switches and the bandwidth values across the links in the chosen path are updated and the process is repeated for other flows.

EXAMPLE 2

Let us consider the example from FIG. 6(a). The input core graph has been partitioned into 4 partitions. We assume 2 different message types: request and response for the various traffic flows. Each partition pi corresponds to the cores attached to the same switch. Let us consider routing the flow with a bandwidth value of 100 MB/s between the vertices v1 and v2, across the partitions p1 and p2. The traffic flow is of the message type request. Initially no physical paths have been established across any of the switches. If we have to route the flow across a link between any two switches, we have to first establish the link. The cost of routing the flow across any pair of switches is obtained. We annotate the edges between the switches by the cost (marginal increase in power consumption) of sending the traffic flow through the switches (FIG. 6(c)). The costs on the edges from p2 are different from the others due to the difference in initial traffic rates within p2 when compared to the other switches. This is because, the switch p2 has to support flows between the vertices v2 and v3 within the partition. The least cost path for the flow, which is across switches p1 and p2 is chosen. Now we have actually established a physical path and a link between these switches. We associate the message type request for this particular link. This is considered when routing the other flows and only those traffic flows that are of request type can use this particular physical link. We also note the size and switching activity of these switches that have changed due to the routing of the current flow.

The PATH_COMPUTE procedure returns the sizes of the switches, connectivity between the switches and the paths for the traffic flows. The objective function for establishing the paths is initially set to minimizing power consumption in the switches. Once the paths are established, if hop count constraints are not satisfied, the algorithm gradually modifies the objective function to minimize the hop count as well, using the β parameter (in steps 7, 10 and 11 of Algorithm 2). The upper bound for β, denoted by $β_{thresh}$, is set to the value of power consumption of the flow with maximum rate, when it crosses the maximum size switch in the SCG. At this value of β, for all traffic flows, it is beneficial to take the path with least number of switches, rather than the most power efficient path. The β value is varied in several steps until the hop count constraints are satisfied or until it reaches $β_{thresh}$.

In the next step (step 12, Algorithm 1), the algorithm performs floorplanning to compute the design area and wire-lengths. From the obtained wire-lengths, the power consumption across the wires is calculated. Also, the length of the wires is evaluated to check any timing violations that may occur at the particular frequency $freq_θ$).

In the end, the tool chooses the best topology (based on the user's objectives) that satisfies all the design constraints.

The presented NoC synthesis process scales polynomially with the number of cores in the design. The number of topologies evaluated by the methodology also depends linearly on the number of cores. Thus, the topology synthesis method is highly scalable to a large number of cores and communication flows.

5 Experiments and Case Studies
5.1 Experiments on MCS Benchmarks
We have applied our topology design procedure to six different MCS benchmarks: video processor (VPROC-42 cores), MPEG4 decoder (12 cores), Video Object Plane Decoder (VOPD-12 cores), Multi-Window Display application (MWD-12 cores), Picture-in-Picture application (PIP-8 cores) and IMage Processing application (IMP-23 cores).

For comparison, we also generated mesh topologies for the benchmarks by modifying the design procedure to synthesize NoCs based on mesh structure. To obtain mesh topologies, we generate a design with each core connected to a single switch and restrict the switch sizes to have 5 input/output ports. We also generated a variant of the basic mesh topology: optimized mesh (opt-mesh), where those ports and links that are unused by the traffic flows are removed.

The core graph and the floorplan for the custom topology synthesized by our tool for one of the benchmarks (VOPD) are shown in FIG. 7. The network power consumption (power consumption across the switches and links), average hop count and design area results for the different benchmarks are presented in Table 1. Note that the average hop count is the same for mesh and opt-mesh, as in the opt-mesh only the unused ports and links of the mesh have been removed and the rest of the connections are maintained. The custom topology results in an average of 2.78× improvement in power consumption and 1.59× improvement in hop count when compared to the standard mesh topologies. The area of the designs with the different topologies is similar, thanks to efficient floorplanning of the designs. It can be seen from FIG. 7 that only very little slack area is left in the floorplan. This is because we consider the area of the network elements during the floorplanning process, and not after the floorplanning of blocks. The total runtime of the topology synthesis and architectural parameter setting process for the different benchmarks is presented in Table 1. Given the large problem sizes and very large solution space that is explored (8 different frequency steps, 4 different link widths, 42 cores for VPROC and several calls to the floorplanner) and the fact that the NoC parameter setting and topology synthesis are important phases, the run-time of the engine is not large.

TABLE 1

Comparisons with standard topologies

| Appl | Topol. | Power (mW) | Avg. Hops | Area mm2 | Time (mins) |
|---|---|---|---|---|---|
| VPROC | custom | 79.64 | 1.67 | 47.68 | 68.45 |
|  | mesh | 301.8 | 2.58 | 51.0 |  |
|  | opt-mesh | 136.1 | 2.58 | 50.51 |  |
| MPEG4 | custom | 27.24 | 1.5 | 13.49 | 4.04 |
|  | mesh | 96.82 | 2.17 | 15 |  |
|  | opt-mesh | 60.97 | 2.17 | 15.01 |  |
| VOPD | custom | 30.0 | 1.33 | 23.56 | 4.47 |
|  | mesh | 95.94 | 2.0 | 23.85 |  |
|  | opt-mesh | 46.48 | 2.0 | 23.79 |  |
| MWD | custom | 20.53 | 1.15 | 15 | 3.21 |
|  | mesh | 90.17 | 2.0 | 13.6 |  |
|  | opt-mesh | 38.60 | 2.0 | 13.8 |  |
| PIP | custom | 11.71 | 1 | 8.95 | 2.07 |
|  | mesh | 59.87 | 2.0 | 9.6 |  |
|  | opt-mesh | 24.53 | 2.0 | 9.3 |  |
| IMP | custom | 52.13 | 1.44 | 29.66 | 31.52 |
|  | mesh | 198.9 | 2.11 | 29.4 |  |
|  | opt-mesh | 80.15 | 2.11 | 29.4 |  |

REFERENCE

[1] L. Benini and G. De Micheli, "Networks on Chips: A New SoC Paradigm", IEEE Computers, pp. 70-78, January 2002.

The invention claimed is:

1. A computer implemented method to design a Networks on Chips-based communication system for connecting on-chip components in a multicore system, said multicore system comprising processors, and hardware blocks communicating through the communication system, said communication system comprising at least switches, said communication system supporting different types of messages, said method comprising the steps of:
   obtaining predefined communication characteristics modeling the applications running on the multicore system;
   establishing the number and configuration of switches to connect the elements;
   establishing physical connectivity between the elements and the switches for an associated first message type;
   for each of at least two pairs of communicating elements:
      a. defining on a computer a communication path comprising a sequence of switches to be traversed to connect the aforementioned pair of communicating elements;
      b. calculating on a computer metrics as affected by the need to render said path into physical connectivity, said metrics being selected among one or a combination of power consumption of the involved switches, area of the involved switches, number of inputs and outputs of the involved switches, total length of wires used, maximum possible speed of operation of the system and number of switches to be traversed, taking into account any previously defined physical connectivity, wherein the calculating includes considering the establishment of alternate physical connectivity if the previously established physical connectivity is associated with a first message type different from a current message type;
      c. iterating on a computer the steps a and b for a plurality of possible paths;
      d. choosing on a computer the path having the optimal metrics; and
      e. establishing on a computer any missing physical connectivity between the switches so that the selected optimal path occurs across physically connected switches.

2. The method of claim 1, wherein the number of switches in the communication system is iteratively modified, with each iteration resulting in a different communication system having its own metrics, and then the communication system having the optimal metrics is selected.

3. The method of claim 2, wherein the optimal communication system is further selected based on predefined communication system constraints.

4. The method of claim 1, wherein the switches are connected to the elements through one or more Network Interfaces.

5. The method of claim 1, wherein the optimal path is further selected based on predefined path constraints.

6. The method of claim 5, wherein the path constraints include a minimum desired speed of operation, and the selection is achieved by considering the maximum switch size that can support the desired speed.

7. The method of claim 5, wherein the path constraints contain at least a minimum bandwidth requirement and the optimal path is selected by considering only those paths that meet that constraint.

8. The method of claim 7, wherein an additional physical connection is established when the already established ones do not satisfy the bandwidth requirements.

9. The method of claim 7, in which the switches comprise buffers, wherein the number of buffers in the switches of a path is selected based on the bandwidth utilization of the path.

10. The method of claim 5, wherein when defining the communication path, more than one physical connection is created between the same two switches or between the elements and the switches.

11. The method of claim 10, wherein an additional physical connection is established when the already established ones support a different message type.

12. The method of claim 10, wherein an additional physical connection is established when the already established ones do not satisfy the bandwidth requirements.

13. The method of claim 1, in which the number of wires of the physical connection among two switches is iteratively modified, with each iteration resulting in a different communication system having its own metrics, and then the communication system having the optimal metrics is selected.

14. The method of claim 1, wherein an additional physical connection is established when the already established ones support a different message type.

15. The method of claim 1, wherein when defining the communication path, excluding paths based on a predefined list of forbidden sub-paths, a sub-path being a path or a part of a path.

16. The method of claim 1, wherein the area (or dimensions) of the switches is calculated based on the established number and configurations of the switches, and this information, along with the predefined sizes of the elements, is used in a floorplanning process to compute the metrics of the communication system, which are then utilized to choose a path.

17. The method of claim 16, wherein the position and size of the elements and switches obtained after the floorplanning are fed to a standard back-end tool, simplifying the placement and routing of the multicore system.

18. The method of claim 16, wherein the wires that are long in the floorplan, and that therefore cannot support the required speed, are segmented into multiple smaller wires using pipeline flip-flops or registers, and the resulting delay associated with crossing these pipelined wires is considered during path selection.

19. The method of claim 1, wherein when calculating the metrics, said metrics are calculated also based on the area and power properties of switches operating at the desired speed, and said properties are calculated by linearly interpolating predefined area and power properties at the nominal and maximum speed of operation.

20. The method of claim 1, wherein the design process is repeatedly applied by scaling the predefined communication characteristics modeling the applications, until the simulation of the designed system meets the required performance and delay.

21. A method for making a multicore Networks on Chips-based system, said system comprising processors, hardware blocks, memory and a communications system comprising at least switches, said communication system supporting different types of messages, said method comprising the steps of:
preparing a design for the multicore system by performing the steps of
obtaining predefined communication characteristics modeling the applications running on the multicore system;
establishing the number and configuration of switches to connect the elements;
establishing physical connectivity between the elements and the switches for an associated first message type;
for each of at least two pairs of communicating elements:
a. defining a communication path comprising a sequence of switches to be traversed to connect the aforementioned pair of communicating elements;
b. calculating metrics as affected by the need to render said path into physical connectivity, said metrics being selected among one or a combination of power consumption of the involved switches, area of the involved switches, number of inputs and outputs of the involved switches, total length of wires used, maximum possible speed of operation of the system and number of switches to be traversed, taking into account any previously defined physical connectivity, wherein the calculating includes considering the establishment of alternate physical connectivity if the previously established physical connectivity is associated with a first message type different from a current message type;
c. iterating the steps a and b for a plurality of possible paths;
d. choosing the path having the optimal metrics; and
e. establishing any missing physical connectivity between the switches so that the selected optimal path occurs across physically connected switches; and
manufacturing the multicore system in accordance with the design.

\* \* \* \* \*